United States Patent
Hiraiwa et al.

(10) Patent No.: US 12,112,857 B2
(45) Date of Patent: Oct. 8, 2024

(54) LIGHT WATER REACTOR URANIUM FUEL ASSEMBLY AND OPERATION METHOD OF NUCLEAR FUEL CYCLE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Kouji Hiraiwa, Chigasaki (JP); Kenichi Yoshioka, Yokohama (JP); Rei Kimura, Setagaya (JP); Satoshi Wada, Yokohama (JP); Tsukasa Sugita, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 12 days.

(21) Appl. No.: 17/587,315

(22) Filed: Jan. 28, 2022

(65) Prior Publication Data
US 2022/0328204 A1    Oct. 13, 2022

(30) Foreign Application Priority Data
Mar. 23, 2021    (JP) ................. 2021-048217

(51) Int. Cl.
*G21C 3/32*    (2006.01)
*G21C 19/32*    (2006.01)
(Continued)

(52) U.S. Cl.
CPC ............. *G21C 19/32* (2013.01); *G21C 19/48* (2013.01); *G21C 3/326* (2013.01)

(58) Field of Classification Search
None
See application file for complete search history.

(56) References Cited

U.S. PATENT DOCUMENTS 5,299,241 A * 3/1994 Suzuki ................... G21C 1/024
                                                                 376/435
2016/0284428 A1* 9/2016 Björk ..................... G21C 7/005

FOREIGN PATENT DOCUMENTS

EP    3966835 A1 *  3/2022  ............. G21C 3/326
JP    05045482 A  *  2/1993
(Continued)

*Primary Examiner* — Lily C Garner
(74) *Attorney, Agent, or Firm* — Oblon, McClelland, Maier & Neustadt, L.L.P.

(57) ABSTRACT

According to embodiments, a light water reactor uranium fuel assembly is capable of reducing heating values of both Am-241 and Cm-244, to reduce the amount of generated vitrified waste without using fast reactors. The light water reactor uranium fuel assembly is a light water reactor uranium fuel assembly to be used in a nuclear fuel cycle that extracts. An americium isotope is extracted at the time of reprocessing of spent fuel to be added to a fuel, in which a weight fraction W (unit: wt %) of americium 241 to be added to a fuel heavy metal is in ranges of
  $W < -0.006e^2 + 0.12e - 0.43$ (enrichment: 5 wt % or more),
  $W < -0.000356e + 0.00357$ (enrichment: 4.2 wt % or more and less than 5.0 wt %)
with respect to an average enrichment of uranium 235 e (unit: wt %) of the fuel assembly.

1 Claim, 22 Drawing Sheets

| Enrichment of U-235 (wt%) | Upper limit values of the concentration of Am-241 to be added (wt%) | Lower limit values of the concentration of Am-241 to be added (wt%) |
|---|---|---|
| 4.2 | 0.006 | 0.00497 |
| 5,0 | 0.020 | 0.00525 |
| 7.5 | 0.135 | 0.00556 |
| 10.0 | 0.175 | 0.00500 |

(51) Int. Cl.
*G21C 19/48* (2006.01)
*G21C 3/326* (2006.01)

(56) References Cited

FOREIGN PATENT DOCUMENTS

| JP | H0990078 A | * | 4/1997 |
| JP | 2017-032408 A | | 2/2017 |
| JP | 2019128233 A | * | 8/2019 |

* cited by examiner

| Type of fuel rod (Symbol) | Number | Average enrichment of uranium 235 of uranium fuel rod U (wt%) | Average concentration of burnable-poison of BP-containing fuel rod G (wt%) | Average concentration of Am-241 of fuel rod (wt%) |
|---|---|---|---|---|
| Uranium fuel rod | 32 | 10.0 | 0.00 | 0.35 |
| Burnable-poison-containing fuel rod | 42 | 10.0 | 8.00 | 0.00 |
| Total number | 74 | 10.0 |  | 0.15 |

FIG. 10

| Illustrated symbol number | U-235 enrichment, Adding or no addition of Am-241, and Removal or no removal of Am after reprocessing | Decay heat after reprocessing at 40 years after discharge of spent fuel (W/g) | | | |
|---|---|---|---|---|---|
| | | Am-241 component | Cm-244 component | Total of Am-241 and Cm-244 | Total relative value |
| ① | Not FORSETI ($^{241}$Am not added) | 1.2E-04 | 2.90E-05 | 1.49E-04 | 100% |
| ② | FORSETI ($^{241}$Am not added) | 9.03E-05 | 2.02E-06 | 9.23E-05 | 62% |
| ③ | FORSETI ($^{241}$Am added 0.15wt%) | 0 | 1.62E-05 | 1.62E-05 | 11% |

FIG. 12

| Illustrated symbol number | U-235 enrichment, Adding or no addition of Am-241, and Removal or no removal of Am after reprocessing | Decay heat after reprocessing at 20 years after discharge of spent fuel (W/g) ||
| --- | --- | --- | --- |
| | | Total of Am-241 and Cm-244 | Total relative value |
| ① | Second comparative example | 1.52E-04 | 100% |
| ② | First comparative example | 7.17E-05 | 47% |
| ③ | Present embodiment | 3.49E-05 | 23% |

FIG. 19

| Enrichment of U-235 (wt%) | Upper limit values of the concentration of Am-241 to be added (wt%) | Lower limit values of the concentration of Am-241 to be added (wt%) |
|---|---|---|
| 4.2 | 0.006 | 0.00497 |
| 5,0 | 0.020 | 0.00525 |
| 7.5 | 0.135 | 0.00556 |
| 10.0 | 0.175 | 0.00500 |

LIGHT WATER REACTOR URANIUM FUEL ASSEMBLY AND OPERATION METHOD OF NUCLEAR FUEL CYCLE

CROSS-REFERENCE TO RELATED APPLICATION

This application is based upon and claims the benefit of priority from Japanese Patent Application No. 2021-048217 filed on Mar. 23, 2021, the entire content of which is incorporated herein by reference.

FIELD

An embodiment of the present invention relates to a light water reactor uranium fuel assembly and an operation method of a nuclear fuel cycle.

BACKGROUND

Fuel assemblies used in light water reactors for power generation (to be referred to as light water reactors below) each consist of a plurality of fuel rods containing nuclear materials arranged in a lattice configuration and bundled together. During the power operation of a nuclear reactor, the fuel rods generate heat due to the nuclear fission reaction of the nuclear materials inside the fuel rods. The fuel assembly is configured so that the generated heat is removed by cooling water led into the fuel assembly.

There are two types of light water reactors: a boiling water reactor, which generates electric power by extracting heat from the fuel assembly as steam; and a pressurized water reactor, which generates electric power by extracting heat from the fuel assembly as hot water and transferring it to a heat exchanger called a steam generator to turn it into steam. The former is called a BWR and the latter is called a PWR.

There are two types of fuel assemblies used in the light water reactors (both the BWRs and the PWRs): a uranium fuel assembly, which contains only uranium as the nuclear material to cause a nuclear fission reaction; and a MOX fuel assembly, which contains plutonium (to be referred to as Pu below) and uranium as the nuclear material.

The uranium fuel assemblies contain uranium-234, uranium-235, and uranium-238, which are isotopes of the uranium element, and some of the uranium fuel assemblies also contain uranium-236 (to be referred to as U-234, U-235, U-238, and U-236, respectively). Furthermore, there are two types of uranium fuel rods in the uranium fuel assemblies: a burnable poison-containing uranium fuel rod containing a burnable poison and a uranium fuel rod containing no burnable poison.

The burnable poison is a substance to be added to the nuclear material to control the nuclear fission reaction of the nuclear material, and for example, in the fuel assembly used in the boiling water reactor, gadolinia ($Gd_2O_3$), which is an oxide of gadolinium, is sometimes used, but as the substance having a neutron absorption capability, substances other than gadolinia are also known. The neutron-absorbing capabilities of those substances are attenuated by burnup.

The fuel assembly after generating a certain amount of energy in the light water reactor is called spent fuel (to be referred to as SF below). The term "fuel assembly" mentioned here includes not only the uranium fuel assembly but also the MOX fuel assembly that also contains Pu as a nuclear material in a new fuel. While SF contains Pu, in addition to fission products (to be referred to as FP below) and other uranium isotopes such as residual U-235 and U-238, there is a group of nuclides collectively called minor actinides (to be referred to as MA below) such as those with atomic numbers larger than Pu and neptunium 237 (to be referred to as Np-237 below). In addition to the above example, MA further includes nuclides having Pu or uranium isotopes as a parent nuclide.

Pu is a useful nuclear fissile material, and therefore, in Japan and France, there has been performed nuclear fuel recycling, in which Pu extracted after the chemical process of SF (to be referred to as reprocessing below) and residual uranium are reused as a mixed oxide fuel (to be referred to as MOX fuel below).

FP and MA are mostly unstable nuclides that cause β decay, α decay, or the like. SF that generates heat by those decays needs to be stored for a certain period of time to be cooled down to a heat generating level that allows reprocessing to be performed. After cooling, reprocessing is performed to extract Pu and uranium. MA and FP are contained in the residue as waste.

FP and MA contained in a waste solution after reprocessing also generate decay heat, and are called high-level radioactive waste (to be referred to as HLW below) because the solution is a liquid with high levels of radioactivity and heat generation. After reprocessing, HLW is mixed with glass and solidified (to be referred to as vitrification) in order to stably bury it in strata finally. Among MA and FP remaining in the residue, certain nuclides can be chemically separated. For example, americium, curium, and can be separated from other MA nuclides in reprocessing.

As the decay heat of SF increases due to the effect of burnup or other reasons, the cooling period until reprocessing increases and the storage period in a storage facility becomes longer, and this means the number of reprocessing fuels per year becomes smaller. On the other hand, the certain number of SFs are discharged from the light water reactor for reprocessing every operating cycle. That means the margin of storage capacity of SF in reprocessing facility becomes smaller.

Similarly, as the decay heat of HLW per unit volume increases, the volume of vitrified waste increases because of the upper limit of heat generation per waste volume. As described above, the increase of decay heat affects the storage margin of SF and the capacity margin of the vitrified waste to be buried.

In relation to the capacity margin of the vitrified waste to be buried, there has been considered a technique to extract specific MA nuclides in the reprocessing process, and to add some of the MA nuclides to the nuclear fuel for the light water reactor or fast reactor to transmute them into short half-life nuclides. This technique is called a partitioning and transmutation technology (to be referred to as P&T below). As the MA nuclides subject to P&T, there have been known americium-241 and curium-244 (to be referred to as Am-241 and Cm-244 below, respectively), which have a large heat generation contribution in HLW.

Plutonium-238 also affects largely to decay heat generation in MA contained in SF, but Pu-238 is recovered as fissile material for MOX fuel in reprocessing, and thus only a small amount of Pu-238 is contained in HLW. As the results, its contribution to the heat generation is negligible.

As a result, in the light water reactor, the components of decay heat from MA in SF, which have been cooled 10 years to 100 years after discharge of fuel, are almost Am-241 and Cm-244. As for their temporal changes along the cooling time, the decay heat of Am-241 increases with time, while the decay heat of Cm-244 decreases. As the results, the total decay heats of the two MA's maintain nearly the same level for about 20 years of cooling period.

The increase effect of Am-241 over cooling time is caused by the β decay of plutonium 241 (to be referred to as Pu-241 below) with a half-life of 14.4 years to produce Am-241. This is why the decay heat of Am-241 increases as the cooling period.

As one of the P&T technologies, there has been known a method of adding Am-241 to a fuel in a light water reactor to cause disintegration thereof. For example, there has also been known an example of adding Am-241 to a VVER fuel, which is the one typical type of PWR. In this example, Am-241 has a large capture cross section in a thermal neutron region, so that the transmutation proceeds and Am-241 decreases as the burnup of the fuel assembly increases.

On the other hand, Am-241, which has been transmuted, eventually becomes Cm-244 after repeated transmutations and decays caused by thermal neutron absorption. In other words, as for the transmutation of Am-241 in the light water reactor, the decay heat of Am-241 decreases while the decay heat of Cm-244 increases.

There has also been an example of adding MA to a fuel in BWR to cause disintegration of MA. In this example, the nuclide of Am alone is not added, but all four nuclides of Np-237, Am-241, Am-243, and Cm-244 among MA are simultaneously added only to a special fuel for burning MA at a fixed ratio and are simultaneously and uniformly added to a $UO_2$ fuel. Further, as an example to evaluate this, only the case where the weight fraction of uranium of MA is 5 wt % is described. Further, in this example, the enrichment of U-235 in the uranium fuel rod is set as a standard value, and the enrichment does not increase even if the MA is added.

On the other hand, an example of reducing MA produced from the light water reactor by a method other than P&T includes that to increase the enrichment of U-235 to be equal to or more than the enrichment required to achieve a discharge burnup and reduce the amount of TRU produced. For example, there has been known an example where in the case where the burnup is set to 45 GWd/t and the average enrichment of uranium 235 is required to be about 3.8 wt %, the average enrichment of uranium 235 is set to 10 wt %, to thereby reduce the total weight fraction of MA in SF as compared to a fuel not increasing the standard enrichment.

In this example, as compared to the fuel not increasing the standard enrichment, the production amount of Pu-241, which is the parent nuclide of Am-241, and the production amount of Cm-244 are each greatly reduced.

Until the spent fuel is reprocessed, it needs to be cooled to the level of decay heat that the reprocessing system can accept, and the latest standards of reprocessing plants in Japan require 15 years or more of cooling before shearing the uranium fuel rods in reprocessing plant.

High-level radioactive wastes are vitrified and then buried in strata to be stored semi-permanently, namely, geological disposal is performed, which requires geological disposal sites proportional to the amount of vitrified waste. A suitable geological disposal site needs to be a place where there is little geological change over tens thousands of years, and the number of available sites is limited. If the amount of vitrified waste continues to increase in response to the amount of SF produced, the disposal sites will eventually be full, failing to dispose of the waste because of lack of the site space. As a result, reprocessing can no longer be performed and power generation itself may become impossible. Thus, the current nuclear fuel recycling, in which high-level radioactive wastes are vitrified to be buried in strata as described above, is considered to be unsustainable in the long term, which results in a major issue in the continuation of nuclear power generation.

To solve such an issue, there has been considered to reduce the high-level radioactive waste by P&T. However, since this P&T technology is based on a transmutation reactor such as a fast reactor, which is not a light water reactor, a very long period of time is required to be actual power reactor, and there is a problem that the vitrified waste is generated one after another before the practical application. Therefore, in order to solve this problem, it is necessary to reduce the generation of high-level wastes and the amount of generated vitrified waste from the light water reactor without assuming the fast reactors for transmutation.

To the extent known so far, there has been known a method of reducing Am-241 by recycling use of Am-241, which is a part of the high-level radioactive waste in a light water reactor, to a light water reactor. However, the method of recycling Am-241 to the light water reactor has caused a problem that Cm-244 increases, to fail to reduce the total amount of decay heat of MA with Cm-244 produced originally in light water reactors. Further, there has been known a uranium fuel in a form of reducing the production of MA containing Cm-244 by increasing the enrichment of U-235 to a required burnup or higher in a light water reactor fuel, which has caused a problem of failing to reduce Am-241.

BRIEF DESCRIPTION OF THE DRAWINGS

FIG. 1 is a view illustrating arrangement positions of uranium fuel rods and burnable poison rods of a fuel assembly according to an embodiment.

FIG. 2 is a chart illustrating the enrichment of uranium 235, the concentration of burnable poison, and the concentration of Am-241 according to the embodiment.

FIG. 10 is a chart illustrating a comparison of decay heats in the case of reprocessing being performed 40 years after discharge of fuel from reactor.

FIG. 12 is a chart illustrating a comparison of decay heats in the case of reprocessing being performed 20 years after discharge of fuel from reactor.

FIG. 19 is a chart illustrating an upper limit concentration and a lower limit concentration of Am-241 to be added.

DETAILED DESCRIPTION

The present invention has been made in order to solve the above-described problems, and an object thereof is to provide a light water reactor uranium fuel assembly and an operation method of a nuclear fuel cycle capable of reducing heating generation of both Am-241 and Cm-244, and of reducing the amount of vitrified waste, only in a light water reactor without using a fast reactor.

According to an aspect of the present invention, there is provided a light water reactor uranium fuel assembly including a plurality of fuel rods bundled together and is used in a nuclear fuel cycle that extracts an americium isotope at the time of reprocessing of spent fuel to add the extracted americium isotope to a fuel, wherein a weight fraction W (unit: wt %) of americium 241 to be added to a fuel heavy metal is in ranges of $W<-0.006e^2+0.12e-0.43$ (enrichment: 5 wt % or more), $W<-0.000356e+0.00357$ (enrichment: 4.2 wt % or more and less than 5.0 wt %) with respect to an average enrichment of uranium 235 $e$ (unit: wt %) of the fuel assembly.

Hereinafter, there will be explained a light water reactor uranium fuel assembly and an operation method of a nuclear fuel cycle according to an embodiment with reference to the drawings.

The embodiment relates to such uranium fuel in a form of reducing the production of MA containing Cm-244 by increasing the enrichment level of U-235 to a required burnup or higher, in a new unused fuel. Nuclides of americium containing Am-241 produced by reprocessing SF of the uranium fuel are added to such fuel in a certain concentration range. Added Am-241 decrease as progress of transmutation during burning of the fuel. On the other hand, by the nuclide transmutation of Am-241, the concentration of Cm-244 increases. At for the increase in decay heat of Cm-244 caused by the addition of Am-241, it is possible to determine the concentration condition of Am-241 to be added such that the decrease in Cm-244 caused by employing the uranium fuel with increased enrichment of U-235 becomes a value in a range above the increase in Am-241. By doing in this manner, without increasing the heat generation of Cm-244, produced americium is used for the addition to the fuel, and the amount of Am-241 contained in HLW can be reduced by the amount used for the addition. As a result, the decay heat from Am-241 in HLW decreases by the amount used for the above-described addition to the uranium fuel, and the decay heat of HLW combined with the decay heat of Cm-244 decreases. As a result, the amount of generated vitrified body waste can be reduced.

Figure 20:
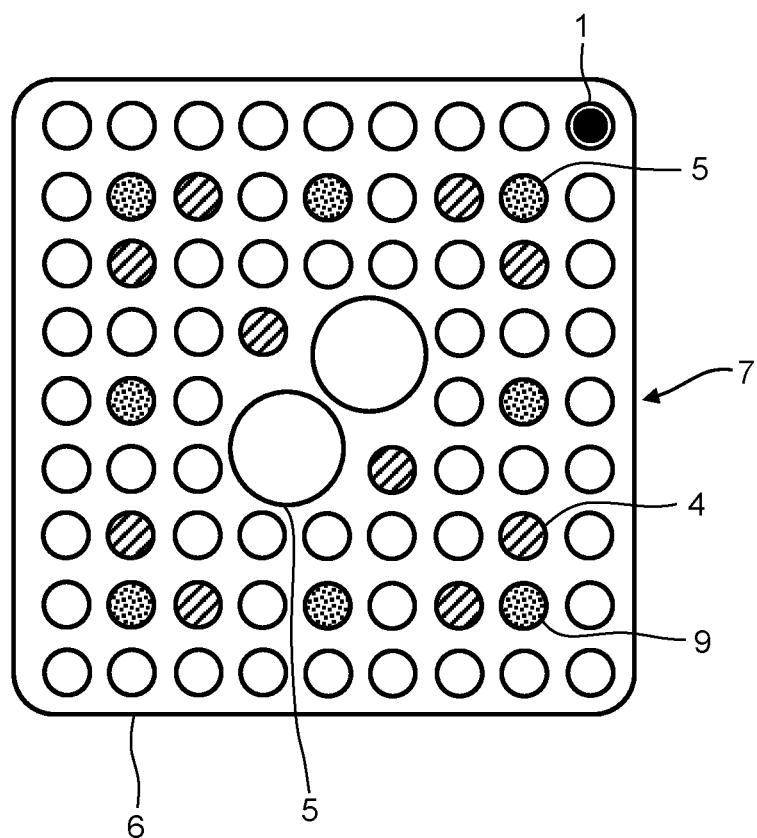
FIG. 20 is a view illustrating a constitution example of a horizontal cross section of a fuel assembly.
Figure 21:
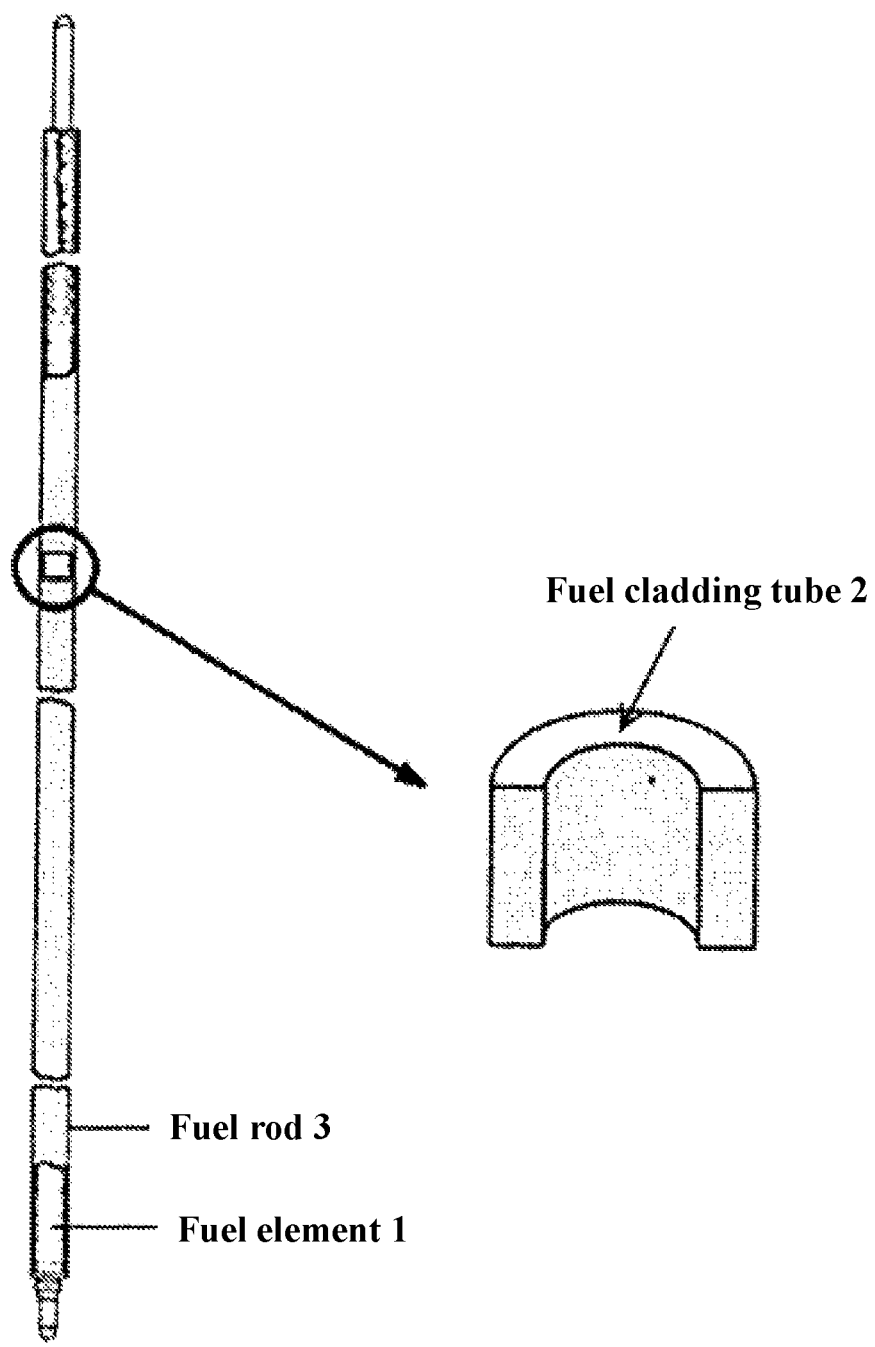
FIG. 21 is a view illustrating a constitution example of a fuel rod.
Figure 22:
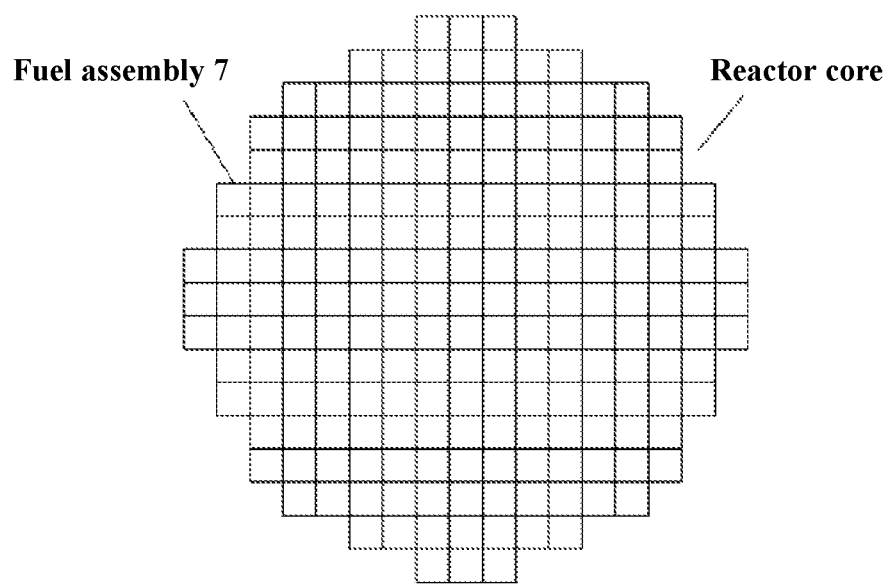
FIG. 22 is a view illustrating a constitution example of a fuel assembly and a control rod in a nuclear reactor.

First, there are explained constitution examples of a fuel assembly, a fuel rod, and a reactor core that have been used conventionally with reference to FIG. 20, FIG. 21, and FIG. 22. The fuel rod 3 consists of fuel elements 1 made of cylindrical sintered uranium dioxide called fuel pellets and a fuel cladding tube 2 with the fuel elements 1 stacked therein in a plurality of stages. The fuel assembly 7 consists of the fuel rods 3, burnable-poison-containing fuel rods 4 each containing a burnable poisonous substance in the fuel element 1, water rods 5 each containing no fuel element thereinside and having cooling water flowing therethrough during operation, and a channel box 6 that is a rectangular hollow cylindrical tube and stores therein the fuel rods bundled together in 9 rows and 9 columns. The reactor core 8 consists of the fuel assemblies 7 arranged in a regular configuration. A plurality of part-length fuel rods 9 are contained in the fuel assembly 7.

Some of the fuel rods 3 contain gadolinium oxide, or gadolinia, as a burnable poison in the fuel element 1, with an average concentration of about 4%. The fuel cladding tube 2 is made of a zirconium alloy called zircaloy 2. The type of light water reactor is a type of plant called an advanced boiling water reactor (ABWR), and the thermal power during rated operation is 3926 MW, the number of fuel assemblies per reactor core is 872, and the weight of uranium metal per one fuel assembly is 172 kg. The thermal power of the reactor core 8 is set to 100% of the rated power, the operation period of one cycle is 13 months, and the average of the extracted fuel element 1 is about 45 GWd/t.

Figure 1:
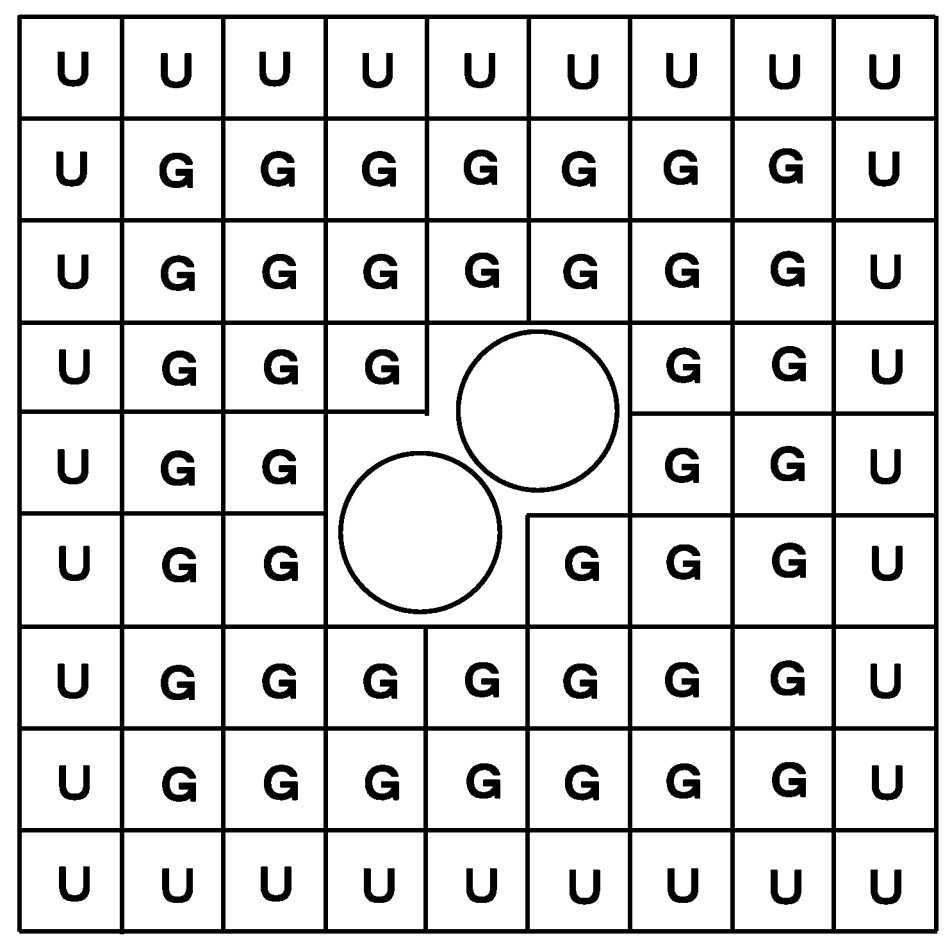

Next, the constitution of an embodiment is illustrated in FIG. 1 and FIG. 2. The fuel assembly 7 includes the fuel rods 4 arranged in 9 rows and 9 columns. Each of the fuel rods 4 includes uranium fuel rods U and burnable-poison-containing fuel rods G containing gadolinia as a burnable poisonous substance. The number of these fuel rods is as follows. The number of uranium fuel rods U is 32 and the number of burnable-poison-containing fuel rods G is 42, which are 75 in total. The average enrichment of uranium 235 of each of the uranium fuel rod U and the burnable-poison-containing fuel rod G is 10 wt %. The concentration of the burnable poison is 8 wt % as illustrated in FIG. 2. Am-241 is added to the uranium fuel rod U in a weight fraction of 0.35 wt %, and is not added to the burnable-poison-containing fuel rod G. The average weight fraction of Am-241 of all the fuel rods is 0.15 wt %. To the burnable-poison-containing fuel rod G, Am-241 is not added in the present embodiment because the amount of poisonous substance to be added needs to be strictly controlled. However, Am-241 may also be added to the burnable-poison-containing fuel rod G.

Figure 3:
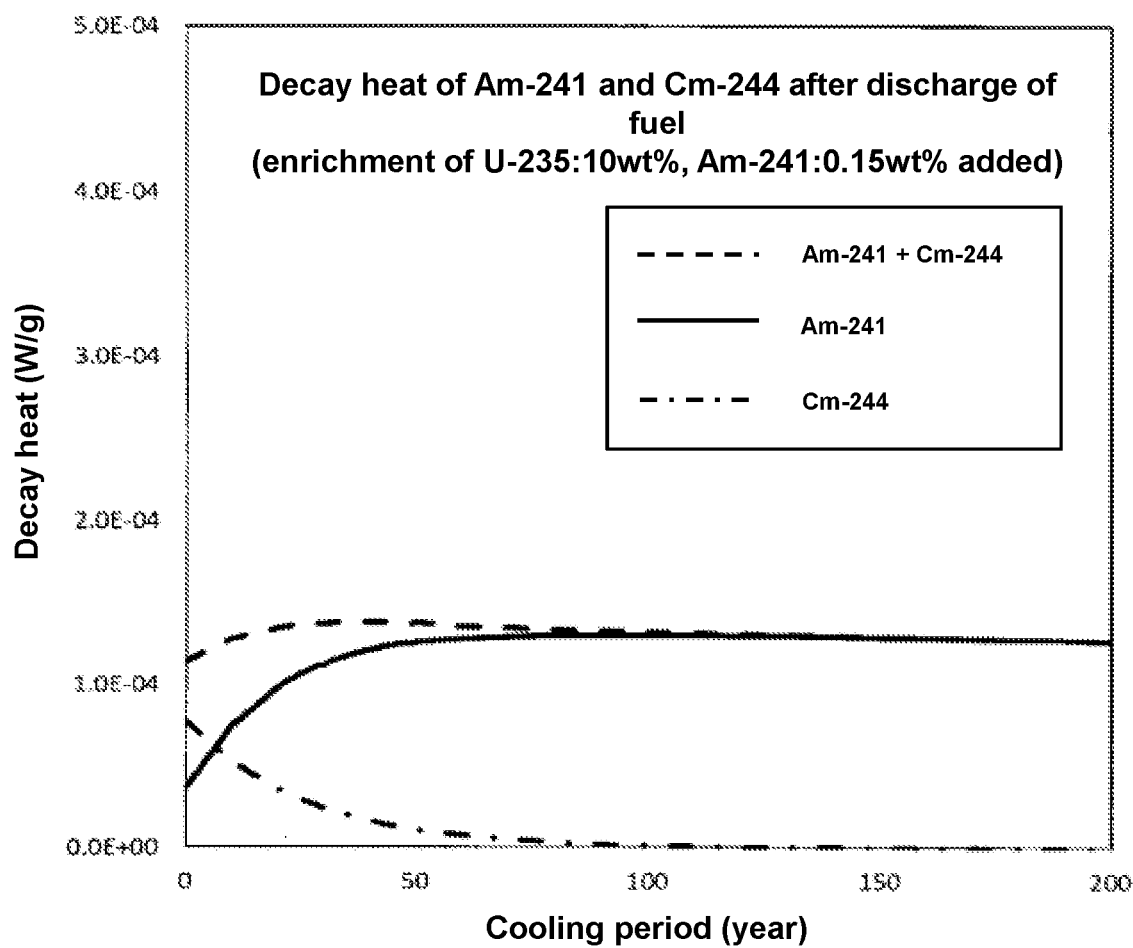
FIG. 3 is a graph illustrating transitions of decay heats according to the embodiment.

Next, the effect and principle of the embodiment will be described in comparison with the conventional technique. FIG. 3 illustrates temporal changes in decay heats of Am-241, Cm-244, and the total of them when the uranium fuel in the embodiment is burned at a burnup of 45 GWd/t and then extracted from the reactor core and then cooled. A horizontal axis of FIG. 3 indicates cooling period (year), and a vertical axis indicates decay heat (W/g). Those of FIGS. 4 to 7, 11, 15 to 18 later described are similar.

Figure 4:
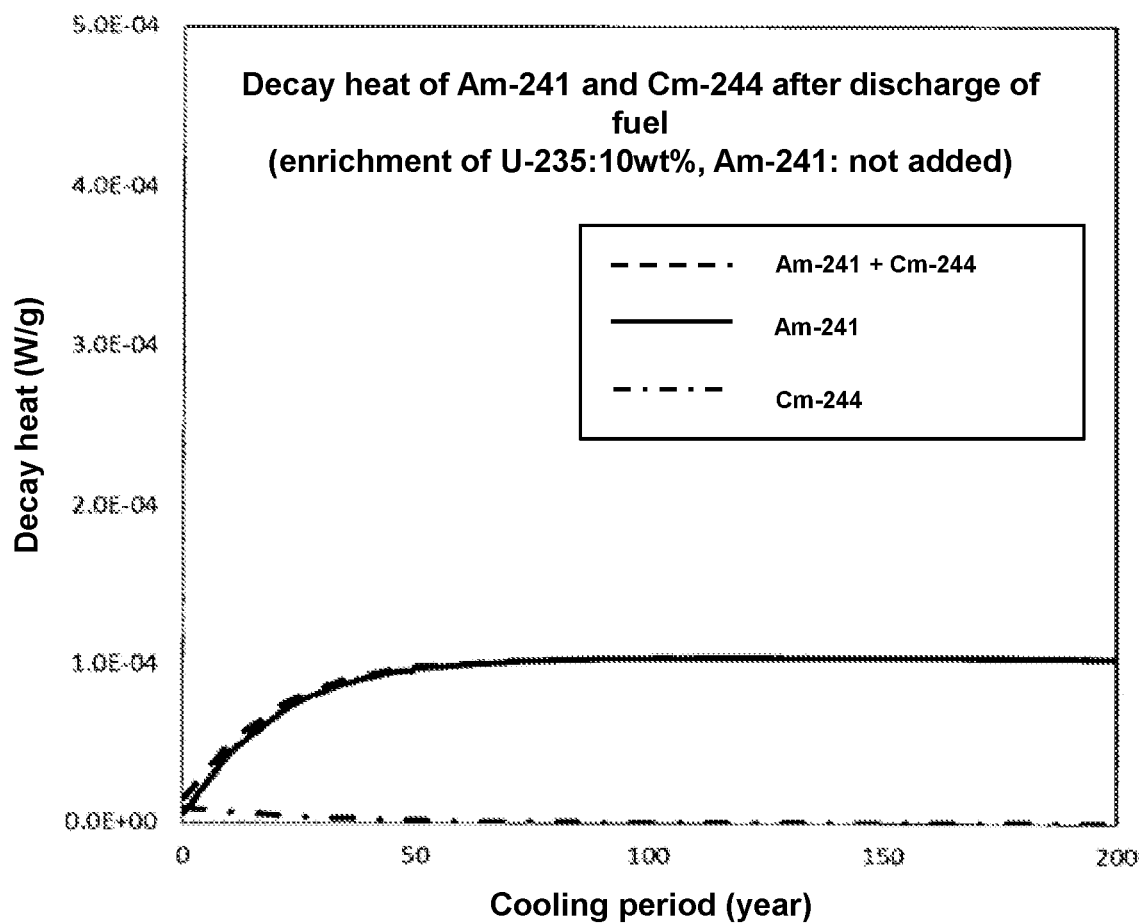
FIG. 4 is a graph illustrating transitions of decay heats according to comparative example 1.
Figure 5:
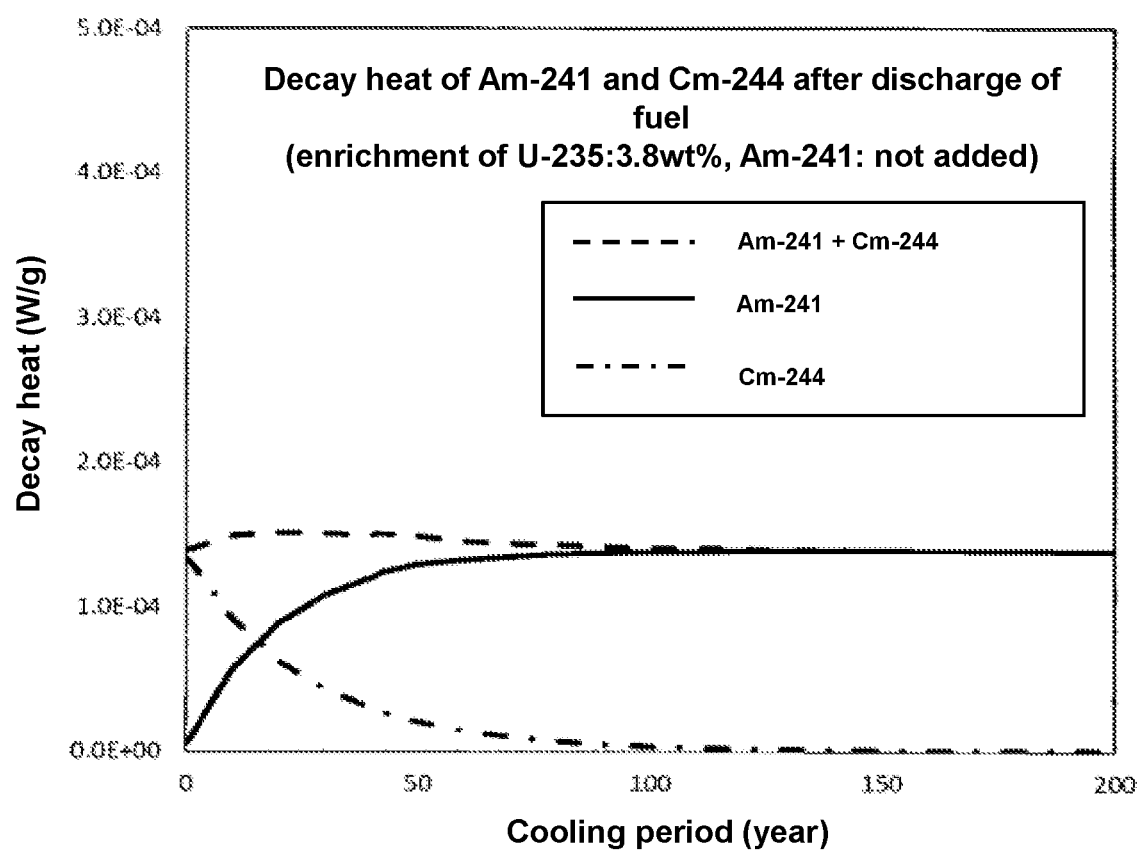
FIG. 5 is a graph illustrating transitions of decay heats according to comparative example 2.
Figure 6:
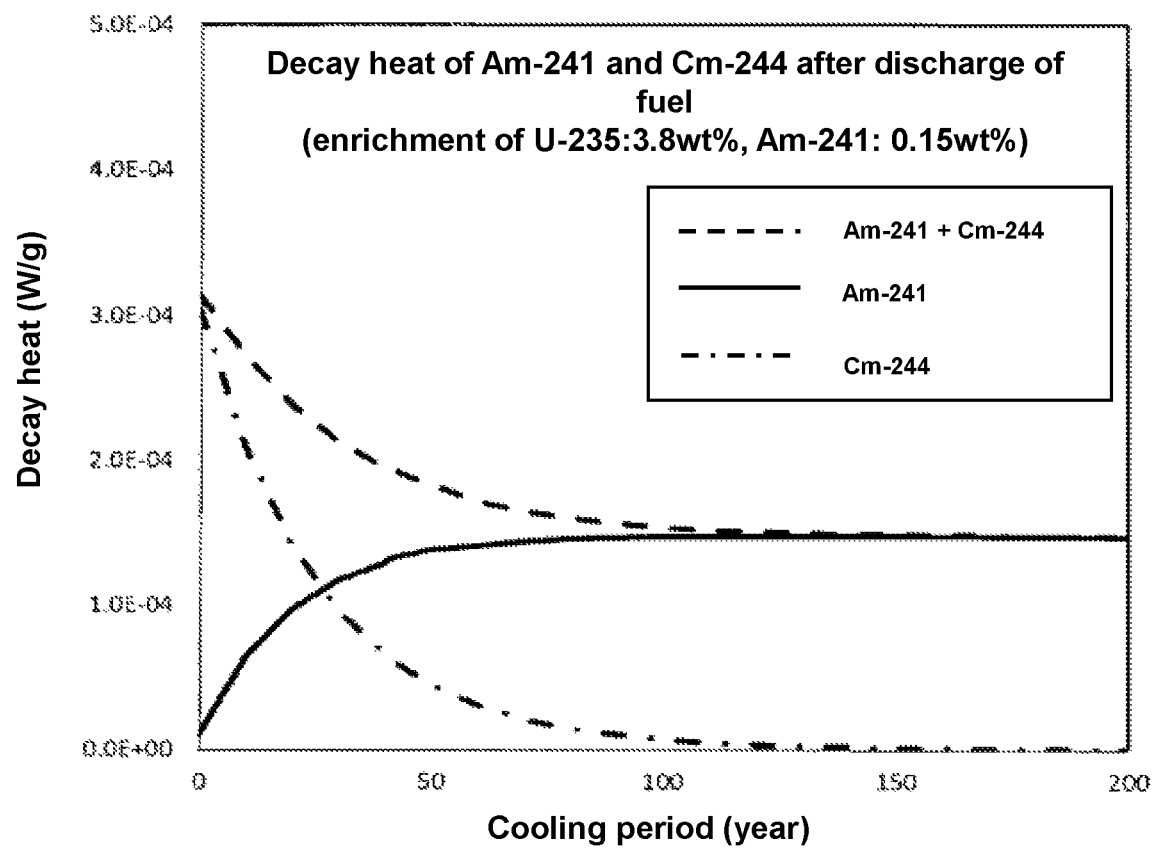
FIG. 6 is a graph illustrating transitions of decay heats according to comparative example 3.

The results of comparative examples, in which burning was performed under the same burnup condition as in the case of the conventional technique and cooling was performed, are illustrated in FIG. 4, FIG. 5, and FIG. 6.

FIG. 4 illustrates the result of a first comparative example in which the only difference is that Am-241 is not added to the fuel assembly 7 with the same uranium enrichment and burnup to the embodiment. Compared to the first comparative example, in the embodiment, the decay heats of Am-241, Cm-244, and the total of them all increase during the initial stage of cooling and about 70 years later. This is because Am-241 was added in the embodiment, and therefore, Am-241 remained unburned and by the transmutation of added Am-241, Cm-244 was produced to increase as compared to the first comparative example. As a result, the decay heat has increased in the embodiment, but as will be described later, the component of Am-241 can be removed from the decay heat after reprocessing to make only Cm-244 remain, and thus, the decay heat after reprocessing in the embodiment decreases greatly.

FIG. 5 illustrates the result of a second comparative example in which the average enrichment of uranium 235 is set to 3.8 wt %, and the burnup is 45 GWd/t, which is the same as in the embodiment. However, Am-241 is not added. As a result of a comparison between the second comparative example and the embodiment, the decay heats of Am-241, Cm-244, and the total of them exhibit substantially the same change. This is because in the embodiment, the decrease in the amount of decay to Am-241 due to the decrease in the production of Pu-241 caused by the increase in the enrichment without increasing the burnup and the increase in transmutation of Am-241 added to a new fuel to Cm-244 were cancelled each other. As these results, the decay heat of the embodiment is substantially the same as that of the second comparative example, but the decay heat after reprocessing can be reduced greatly in the present embodiment for the reasons mentioned above.

FIG. 6 illustrates the result of a third comparative example in which the average enrichment of uranium 235 is set to 3.8 wt %, and the burnup is 45 GWd/t, which is the same as in the present embodiment. Further, Am-241 is added at a concentration of 0.15 wt %, which is the same as in the embodiment. As a result of a comparison between the third comparative example and the embodiment, the decay heat of Cm-244 decreases greatly, and the decay heat of the total of them decreases greatly, especially in the initial stage of cooling, with a slight decrease in the decay heat of Am-241. In the embodiment, the effect of reducing the decay heats of Am-241 and Cm-244 by the increase in the enrichment without burnup and the effect of increasing the decay heat due to the addition of Am-241 to a new fuel were almost cancelled each other. But in the third comparative example, the decay heats of Cm-244 and Am-241 both increase by Am-241 added to the new fuel.

Figure 7:
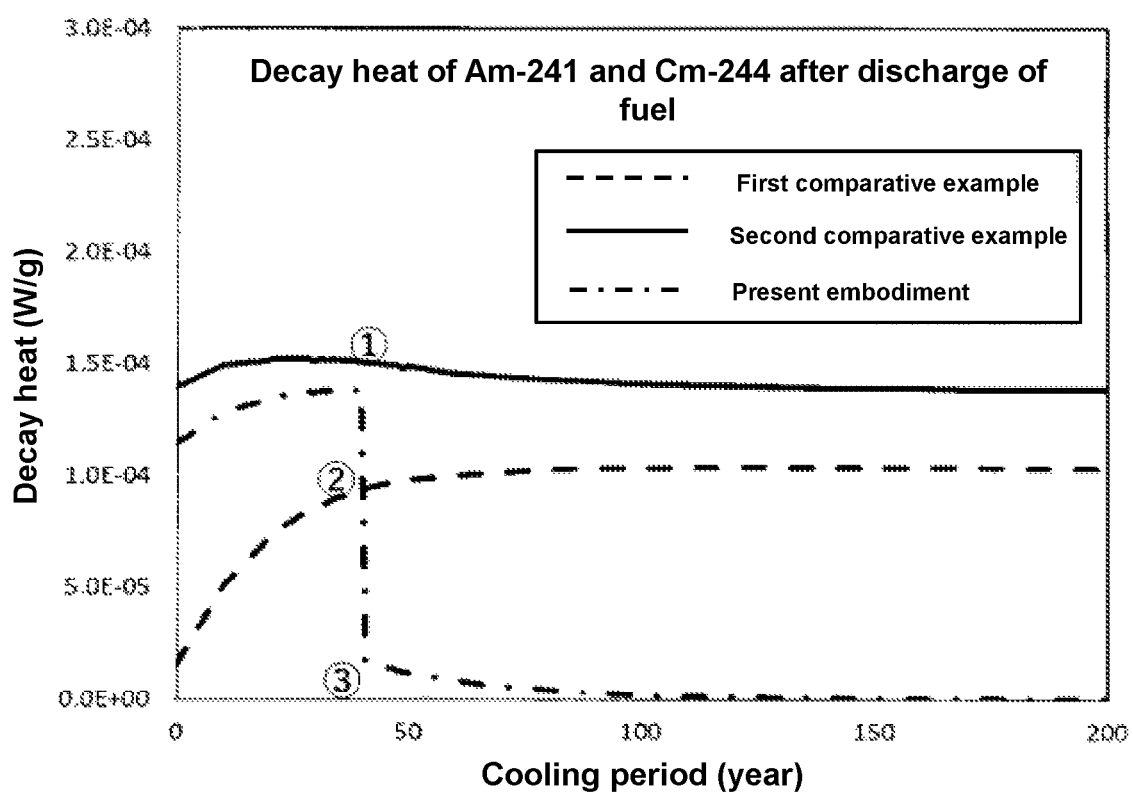
FIG. 7 is a graph illustrating a comparison of transitions of decay heats in the case of reprocessing being performed 40 years after discharge of fuel from reactor.

FIG. 7 illustrates the decay heat of the total of Am-241 and Cm-244 in the case where reprocessing is performed 40 years after discharge of SF in the embodiment from the reactor core and HLW containing Am-241 and Cm-244 is vitrified (the dashed dotted line 3 in FIG. 7). As for the values of decay heat to be compared, in the drawing, the solid line 1 indicates the second comparative example and the dotted line 2 indicates the first comparative example. In the present embodiment, after reprocessing, the entire amount of Am-241 is added to the uranium fuel, and thereby Am-241 is not left on the HLW side, and thus, all the decay heat of Am-241 is excluded from the total decay heat of HLW after reprocessing.

Figure 8:
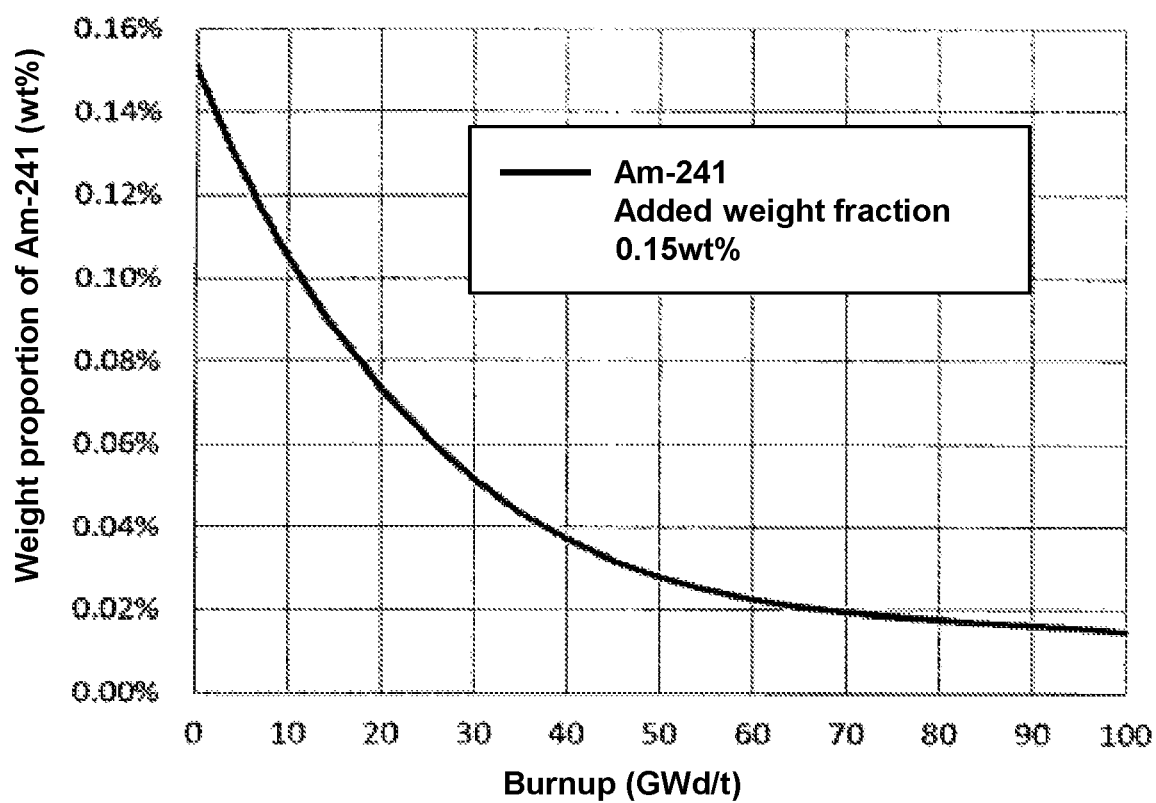
FIG. 8 is a graph illustrating a transition of a change to burnup of a weight proportion of Am-241 according to the embodiment.
Figure 9:
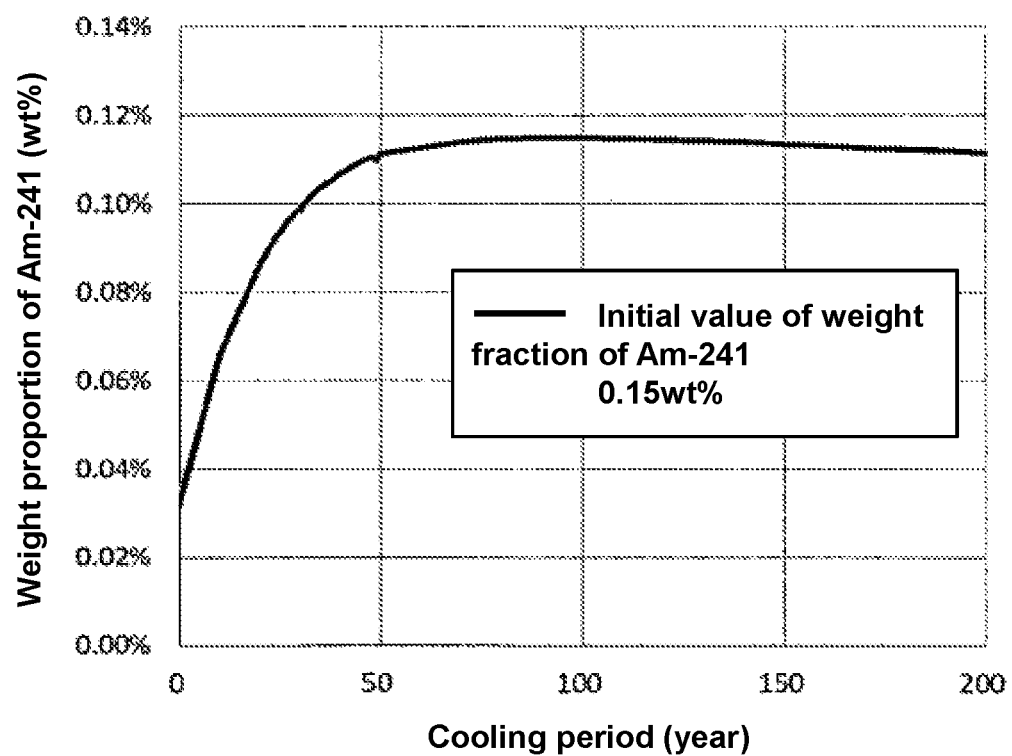
FIG. 9 is a graph illustrating a transition of a change in cooling of the weight proportion of Am-241 after discharge of fuel from reactor according to the embodiment.

The reason for being able to do like this is as follows. FIG. 8 illustrates the change of the weight fraction of Am-241 to burnup in the present embodiment, and FIG. 9 illustrates the temporal change in the weight fraction of Am-241 in the case where the spent fuel is extracted at a burnup of 45 GWd/t to be cooled. Am-241, which was 0.15 wt % initially, becomes about 0.03 wt % at exposure of 45 GWd/t by burnup, and then increases with the addition of a decay component of Pu-241 during cooling period thereafter. Thereafter, Am-241 becomes 0.11 wt % of the maximum value and then decrease. That is, even if 0.15 wt % of Am-241 is added, it will be less than 0.15 wt % at the time of discharge, and therefore, if the entire amount of Am-241, which is produced by burnup, is used to be added to the fuel, there is no need to leave any Am-241 on the HLW side. That is, if Am-241 is repeatedly added to the uranium fuel in an appropriate concentration range, Am-241 produced by burnup of the fuel can always be confined in the reactor core of the light water reactor using the uranium fuel. In contrast to this, in each of the comparative examples, instead of adding Am-241 to the uranium fuel, the decay heat of Am-241 is contained in the decay heat of HLW, and the decay heat of HLW increases by that amount and the amount of vitrified waste increases. When 0.15 wt % of Am-241 is repeatedly added, the amount of Am-241 remaining in SF gradually decreases, but for example, if Am-241 from SF of four to five assemblies is collected and used, the addition of 0.15 wt % of Am-241 is always possible, and the present invention is always applicable.

In FIG. 10, a comparison is made between the first comparative example (2 in the drawing) and the second comparative example (1 in the drawing) in the value of the decay heat of the total of Am-241 and Cm-244 after reprocessing in the present embodiment and is illustrated. FORSET1 in FIG. 10 indicates a light water reactor uranium fuel assembly using enriched uranium with an excessive concentration. In the present embodiment (3 in the drawing), Am-241 can be excluded after reprocessing, and thus the resultant decay heat is generated only with the component derived from Cm-244. As a result, the decay heat greatly decreases by the value of 11% as compared to the second comparative example. The heating value of HLW in the vitrified waste is limited so that the temperature of the vitrified waste becomes equal to or less than a certain temperature, and thus the amount of the vitrified waste decreases proportionally with the decrease in the decay heat of HLW. Although there has been explained the case where FP is not contained in the vitrified waste in the present embodiment, it is clear that the vitrified waste can be reduced by the present embodiment even if FP is present.

Figure 11:
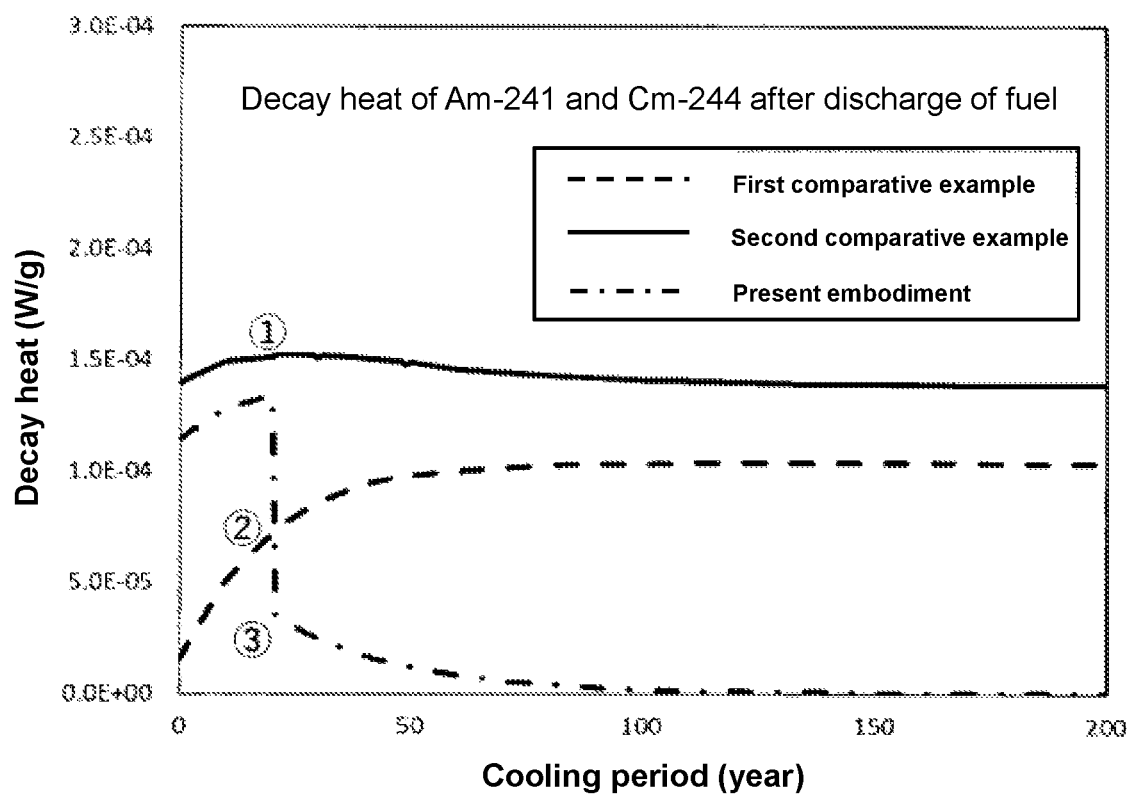
FIG. 11 is a graph illustrating a comparison of decay heats in the case of reprocessing being performed 20 years after discharge of fuel from reactor.

FIG. 11 illustrates the temporal change in cooling of the total value of the decay heats of Am-241 and Cm-244 in the case of performing reprocessing at 20 years after discharge of SF, in the present embodiment, from the reactor core (the dashed dotted line 3 in FIG. 7) together with the first comparative example (the dotted line 2 in the drawing) and the second comparative example (the solid line 1 in the drawing). Although the same effect as in FIG. 7 can be obtained in the present embodiment, the amount of decay heat increases as compared to the embodiment in FIG. 7 because the attenuation of Cm-244 after discharge of SF is small due to the earlier reprocessing time. FIG. 12 illustrates a comparison in the value of decay heat, where the value of decay heat greatly decreases to 23% as compared to the second comparative example. Even if the cooling period until reprocessing is shortened as above, the vitrified waste can be greatly reduced according to the present embodiment.

Figure 13:
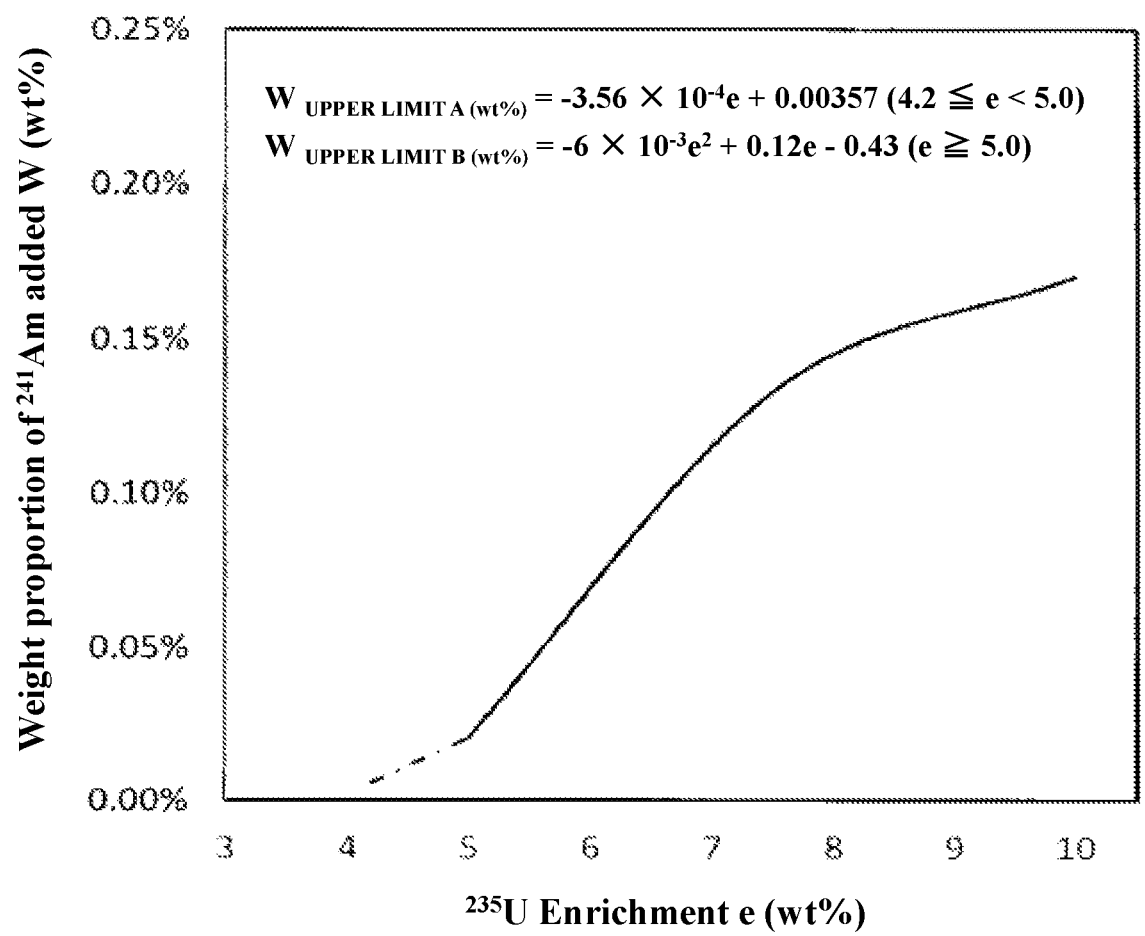
FIG. 13 is a view explaining mathematical equations/expressions that limit a concentration range of Am-241 to be added.

Next, there is illustrated in FIG. 13 a range of the concentration of Am-241 that should be added, including the present embodiment. In the case where the concentration of Am-241 is set to W (wt %) and the enrichment of uranium 235 is set to e (wt %), the following inequality expressions that determine the upper limit are applied.

$$W<-0.006e^2+0.12e-0.43 \text{ (enrichment: 5 wt \% or more)} \quad \text{Expression (1)}$$

$$W<-0.000356e+0.00357 \text{ (enrichment: 4.2 wt \% or more and less than 5.0 wt \%)} \quad \text{Expression (2)}$$

The range of the upper limit of the concentration W of Am-241 to be added to the uranium fuel is limited because the following advantages can be obtained.

The upper limit is set so that the decay heats of Am-241 and Cm-244 in SF do not exceed the decay heat of a fuel having a standard enrichment of 3.8 wt %. Although the decay heat in SF contains the components derived from FP, the decay heat of FP is hardly affected by the composition or burnup of the fuel. Therefore, the above theory holds true without modification even with the addition of Am-241.

Figure 14:
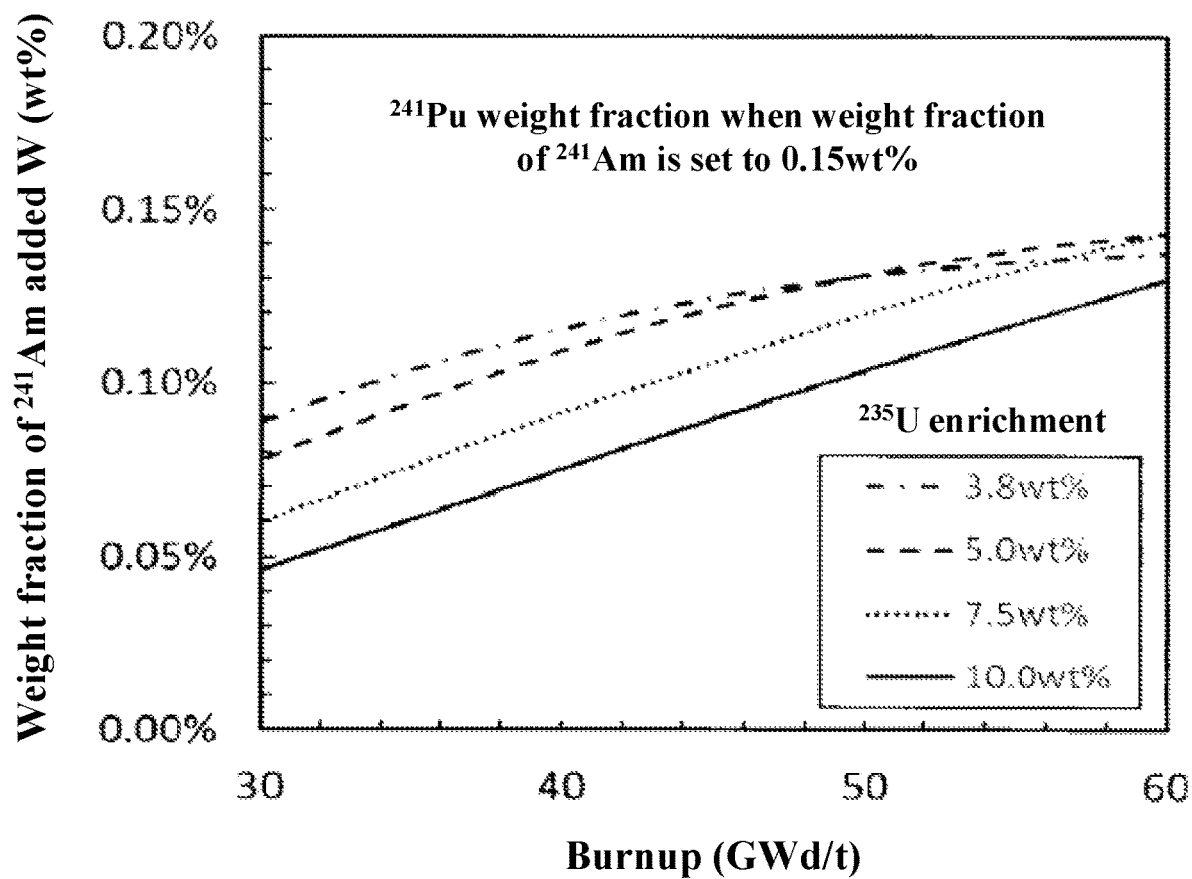
FIG. 14 is a graph illustrating differences in burnup of weight proportions during burning of Pu-241.

It is conceivable to set certain conditions for the range of burnup to which the present embodiment can be applied. This point is explained while using FIG. 14. FIG. 14 illustrates the weight fraction of Pu-241 during burnup in the range of between 30 GWd/t and 60 GWd/t in the case where the enrichment of uranium 235 is changed to 3.8 wt %, 5.0 wt %, 7.5 wt %, and 10.0 wt %, and the weight fraction of Am-241 to be added is 0.15 wt %. During cooling after discharge of SF, Pu-241 decays with a half-life of 14.4 years to be transmuted into Am-241. Considering that the reprocessing is performed after 15 years or more have passed since discharge of SF and that the weight fraction of Am-241 immediately after discharge of SF is several percent of that of Pu-241, the upper limit of Am-241 in SF at the time of reprocessing is the amount of Pu-241 when SF is discharged. Therefore, the upper limit of the weight fraction of Am-241 in SF at the time of reprocessing is that of Pu-241 illustrated in FIG. 14, regardless of the cooling period. The upper limit of the weight fraction of Pu-241 is 0.14 wt % in the range of burnup of 60 GWd/t or less, and thus, the weight fraction of Am-241 in HLW does not exceed 0.14 wt % in this burnup range.

In the case where Am-241 is added at 0.15 wt % as in the present embodiment, Am-241 at the time of addition can exceed the weight fraction of Am-241 in HLW in any cooling period within the above burnup range. This means that the entire amount of Am-241 can be confined in the uranium fuel not to allow it to move to the HLW side. However, if the condition that the entire amount of Am-241 is confined in the uranium fuel is not provided, the weight fraction of Am-241 to be added to the uranium fuel may be determined within the ranges of the expressions (1) and (2).

Figure 15:
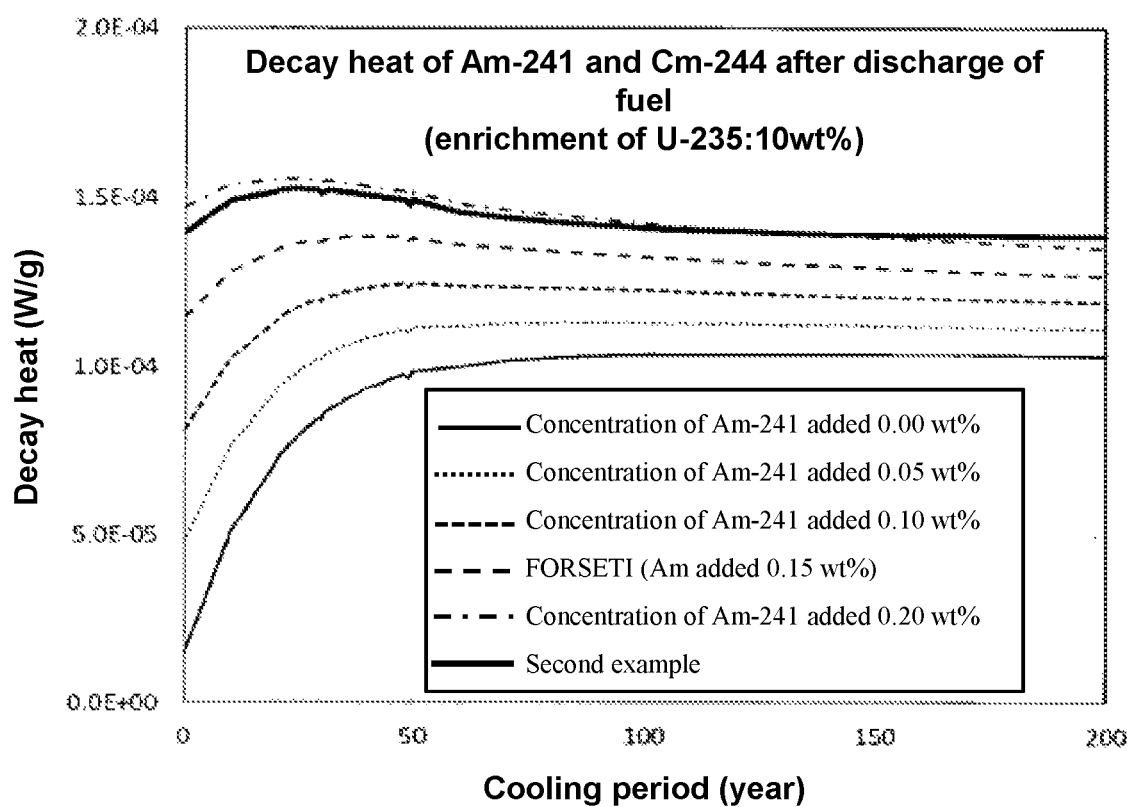
FIG. 15 is a graph illustrating a transition of decay heat at each concentration of Am-241 in the case of the enrichment of uranium 235 being 10 wt %.

There is explained the rationale for the expressions (1) and (2) intended for setting the upper limit while using FIG. 15, FIG. 16, FIG. 17, and FIG. 18. First, FIG. 15 is explained. In the fuel assembly in the embodiment in which the average enrichment of uranium 235 is 10 wt % and the burnup is 45 GWd/t, a comparison of the total value of the total decay heat of Am-241 and Cm-244 in SF when the concentration of Am-241 to be added (unit: wt %) is changed to 0.0, 0.05, 0.10, 0.15, and 0.20 with the standard decay heat of the second comparative example (enrichment of uranium 235: 3.8 wt %) is made and illustrated. In the case of the enrichment of 10 wt %, the total decay heat of Am-241 and Cm-244 increases almost proportionally to the weight fraction of Am-241. The weight fraction of Am-241 to be added, which is capable of obtaining the decay heat that is less than the decay heat of the standard fuel, is 0.17 wt % according to the drawing. That is, in the case of the average enrichment of uranium 235 of 10 wt %, unless the concentration of Am-241 to be added is set to less than 0.17 wt %, the decay heat exceeds the standard decay heat of the second comparative example.

Figure 16:
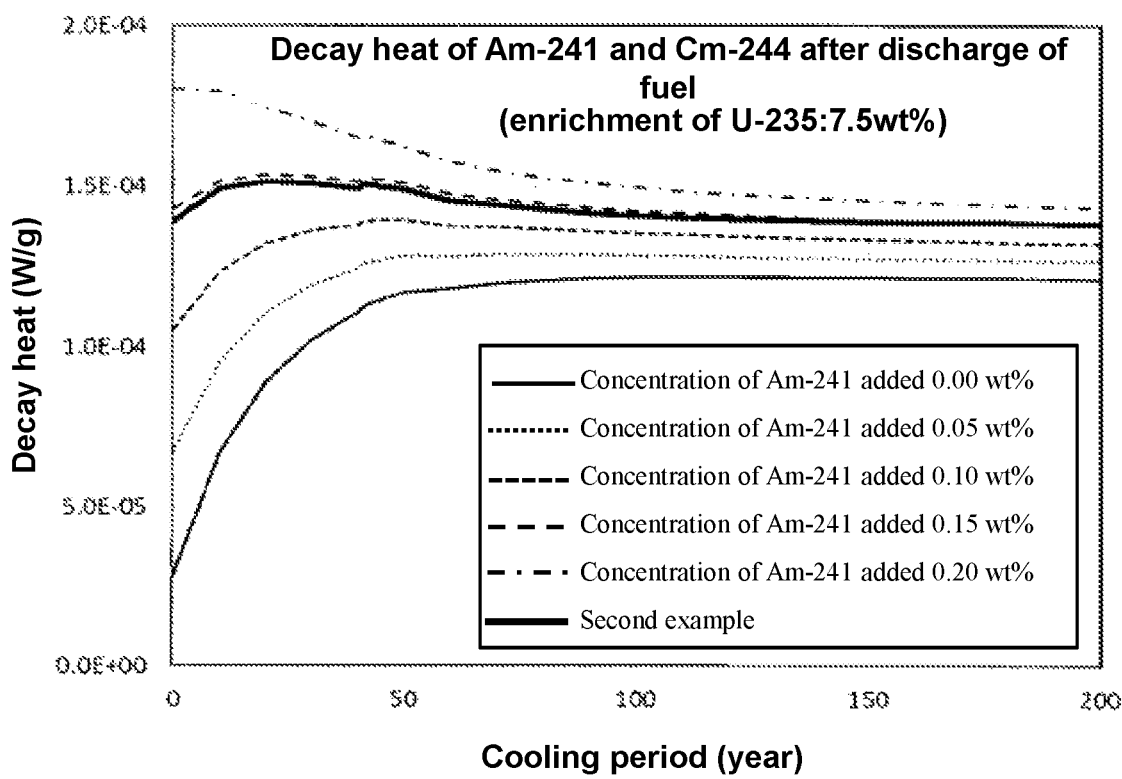
FIG. 16 is a graph illustrating a transition of decay heat at each concentration of Am-241 in the case of the enrichment of uranium 235 being 7.5 wt %.
Figure 17:
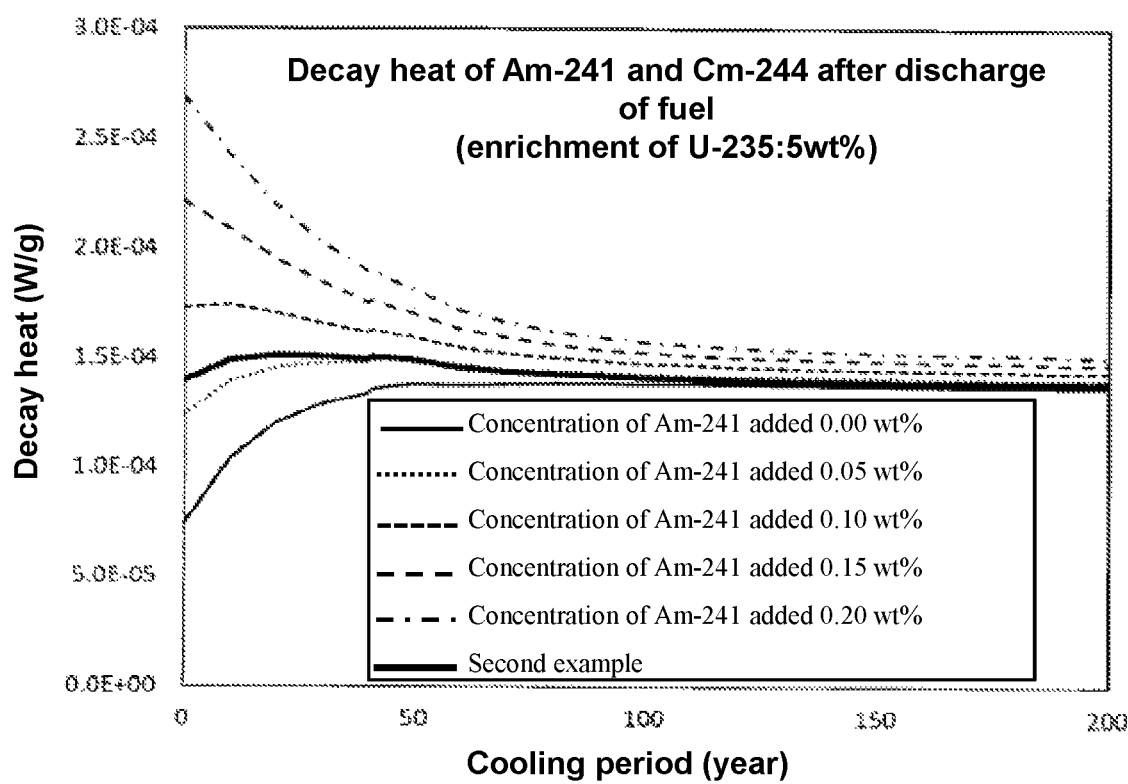
FIG. 17 is a graph illustrating a transition of decay heat at each concentration of Am-241 in the case of the enrichment of uranium 235 being 5.0 wt %.
Figure 18:
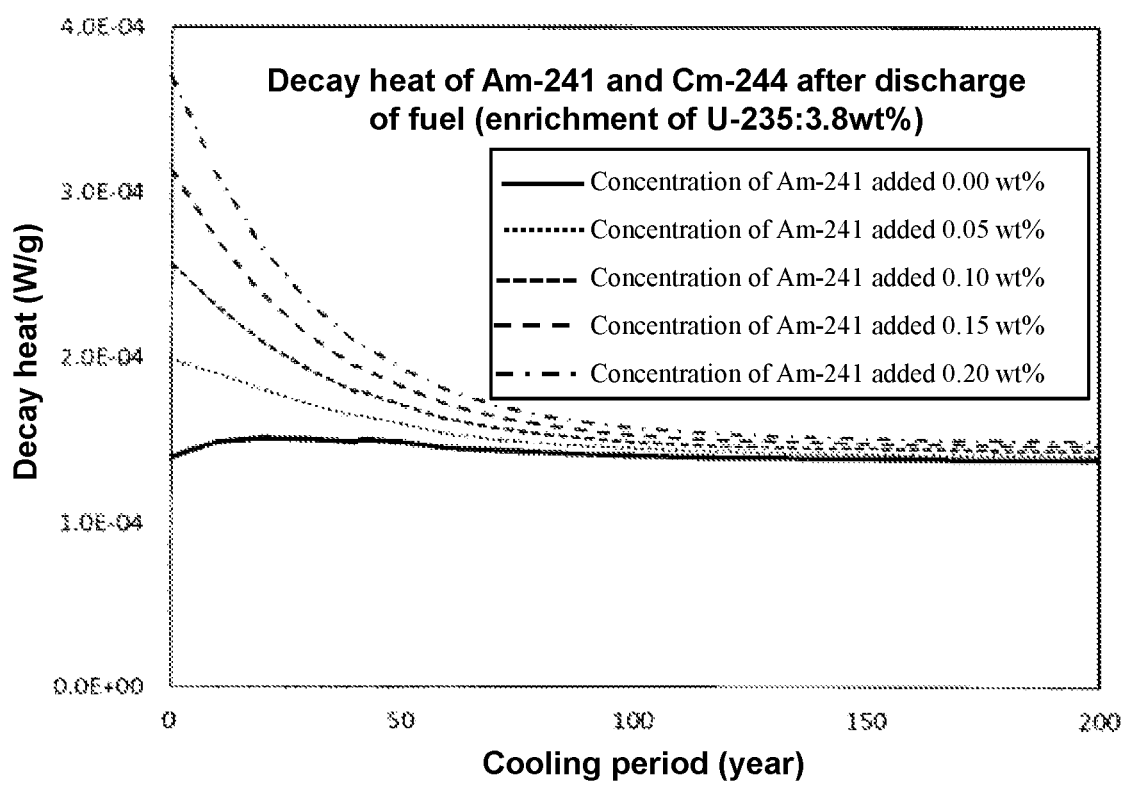
FIG. 18 is a graph illustrating a transition of decay heat at each concentration of Am-241 in the case of the enrichment of uranium 235 being 3.8 wt %.

FIG. 16, FIG. 17, and FIG. 18 illustrate the cases where the same examination as in FIG. 15 is performed in the case of the enrichment of uranium 235 (unit: wt %) being changed to 7.5, 5.0, and 3.8. With the same method of thinking as in FIG. 14, the upper limit of the concentration of Am-241 responsive to the enrichment is 0.135, 0.02, and 0.0 respectively. As a matter of course, in the case of the enrichment of 3.8 wt %, Am-241 cannot be added. Although not illustrated, in the case of the enrichment of 4.2 wt %, the upper limit is 0.056 wt % when a linear interpolation is performed from the magnitude relationship between FIG. 17 and FIG. 18.

FIG. 19 illustrates a chart where the upper limit values of the concentration of Am-241 to be added obtained from FIG. 15, FIG. 16, FIG. 17, and FIG. 18 are summarized, and the expression (1) and the expression (2) are mathematically expressed based on these values.

In the foregoing, while certain embodiments of the present invention have been described, these embodiments have been presented by way of example only, and are not intended to limit the scope of the inventions. Indeed, the novel methods described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

What is claimed is:

1. A fresh fuel assembly for a light water reactor, comprising:
    a plurality of fuel rods bundled together, including uranium fuel rods and poison rods,
        wherein the uranium fuel rods contain fissile uranium and americium reprocessed from spent fuel and do not contain a neutron poison, and
        wherein the poison rods contain both uranium and a neutron poison;
    wherein each of the uranium fuel rods contains a wt. % of americium-241 that is:
        smaller than $-0.006e2+0.12e-0.43$ when the uranium enrichment e is 5 wt. % or more, and
        smaller than $-0.000356e+0.00357$ when the uranium enrichment is 4.2 wt. % or more and less than 5.0 wt. %.

* * * * *